United States Patent
Lotito et al.

[19]
[11] Patent Number: 6,129,168
[45] Date of Patent: *Oct. 10, 2000

[54] WEIGHT SENSOR FOR VEHICULAR SAFETY RESTRAINT SYSTEMS

[75] Inventors: James C. Lotito, Warren; Matthew W. Owen, Harper Woods; Ronald A. Marker, deceased, late of Sterling Heights, all of Mich., by Aloysius Marker, Evangeline Marker, legal representatives

[73] Assignee: Breed Automotive Technology, Inc., Lakeland, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,992

[22] Filed: Nov. 19, 1997

[51] Int. Cl.$^7$ .................................................. B60R 21/01
[52] U.S. Cl. ......................... 180/273; 280/735; 340/667; 177/210 EM
[58] Field of Search .......................... 280/735; 180/273; 340/667, 666; 177/136, 210 EM

[56] References Cited

U.S. PATENT DOCUMENTS

| | | | |
|---|---|---|---|
| 4,354,562 | 10/1982 | Newman | 177/210 EM |
| 4,738,325 | 4/1988 | Bullivant et al. | 177/210 EM |
| 5,232,243 | 8/1993 | Blackburn et al. | 280/735 |
| 5,481,078 | 1/1996 | Asche | 180/273 |
| 5,570,903 | 11/1996 | Meister et al. | 280/735 |
| 5,810,392 | 9/1998 | Gagnon | 280/735 |

*Primary Examiner*—Peter C. English
*Attorney, Agent, or Firm*—Markell Seitzman

[57] ABSTRACT

An weight sensor (16) for use in the crash management system of a motor vehicle's safety restraint system (10). The weight sensor (16) functions to determine the weight of an occupant sitting on a vehicle seat (12) and is mounted between the seat frame (42) and mounting structure (46) of the vehicle seat (12). The weight sensor (16) includes a position sensing unit (52) retained in an enclosed housing assembly (50). The weight of a seat occupant causes a portion (56) of the housing assembly (50) to deflect and the position sensing unit (52) measures the corresponding displacement caused by such deflection. The position sensing unit (52) includes a Hall effect sensor (70) fixed to the rigid portion (54) of the housing assembly (50) and a magnet (74) fixed to the deflectable portion (56) of the housing assembly (50). As such, movement of the magnet (74) relative to the Hall effect sensor (70) generates a varying electric output signal which is indicative of the weight of the occupant or object causing the deflection.

6 Claims, 5 Drawing Sheets

6,129,168

WEIGHT SENSOR FOR VEHICULAR SAFETY RESTRAINT SYSTEMS

BACKGROUND AND SUMMARY OF THE INVENTION

The present invention relates to a safety restraint system for use in motor vehicles. In particular, the present invention is directed to a weight sensor for generating a signal indicative of the weight of a person or object seated or located in a vehicle seat.

Safety restraint systems are used in motor vehicles for protecting the vehicle occupants during collisions. In addition to seat belts, many safety restraint systems now include a driver-side air bag mounted in the steering wheel and a passenger-side air bag mounted in the dashboard. Furthermore, recent attention has been directed to incorporation of other restraint devices such as, for example, side air bags, seat belt pretensioners, and energy management retractors into the safety restraint system. Many, if not all, of these restraint devices are activated by the vehicle's crash management system in response to detection of a vehicular collision exceeding a predetermined impact magnitude.

In order to optimize occupant protection during a collision, it is desirable to vary the deployment characteristics of the air bags and/or the operational characteristic of the other restraint devices based on various control parameters, such as the severity of the crash, belt usage, and the position and size of the seated occupant. Thus, the vehicle's crash management system includes various sensors for detecting and/or measuring such control parameters. One particular control parameter that is useful for regulating the output characteristics of the restraint devices is the weight of the seated occupant. As such, a need exists to develop a weight sensing device for use in safety restraint systems.

Accordingly, the present invention is directed to a weight measuring device for incorporation into the crash management system of a motor vehicle's safety restraint system. This objective may be achieved by providing a weight sensor which is sensitive to the magnitude of a displacement of a sensor part caused by an occupant sitting in a vehicle seat and which is indicative of the occupant's weight.

In accordance with the teachings of the present invention, a weight sensor is provided for measuring the weight of a seated occupant. The weight sensor is mounted between the seat frame and the seat mounting structure or between the seat mounting structure and the vehicle floor or within the seat cushion. The weight sensor is comprised of an enclosed housing assembly and a position sensing unit mounted within the housing assembly. The position sensing unit includes a Hall effect sensor fixed in the housing assembly and a permanent magnet mounted to a flexible portion of the housing assembly. In operation, the weight of the seated occupant or object deflects the flexible portion of the housing assembly. As the flexible portion deflects in response to the weight of the object or occupant, the position of the magnet relative to the Hall effect sensor changes to generate a relative change in the sensor output. Upon calibration of the system, this positional variation provides an indication of the weight of the occupant or object. Thus, the position sensing unit generates an output signal which is proportional to the amount of deflection which, in turn, is indicative of the occupant's or object's weight. As can be appreciated, the weight sensor, and its associated electronics, can also provide an indication that no object or occupant is located in the seat.

DETAILED DESCRIPTION OF THE PREFERRED EMBODIMENTS

In general, the present invention is directed to a safety restraint system for a motor vehicle having a crash management system operable for adaptively regulating the output of one or more restraint devices in response to various input signals. More particularly, a weight sensor is disclosed which is applicable for use in otherwise conventional crash management systems for providing a sensor input signal to the controller indicative of the occupant's weight. Thus, while the weight sensor of the present invention is shown incorporated into a particular safety restraint system, such is merely exemplary of but one safety restraint system to which the weight sensor can be incorporated.

Figure 1:
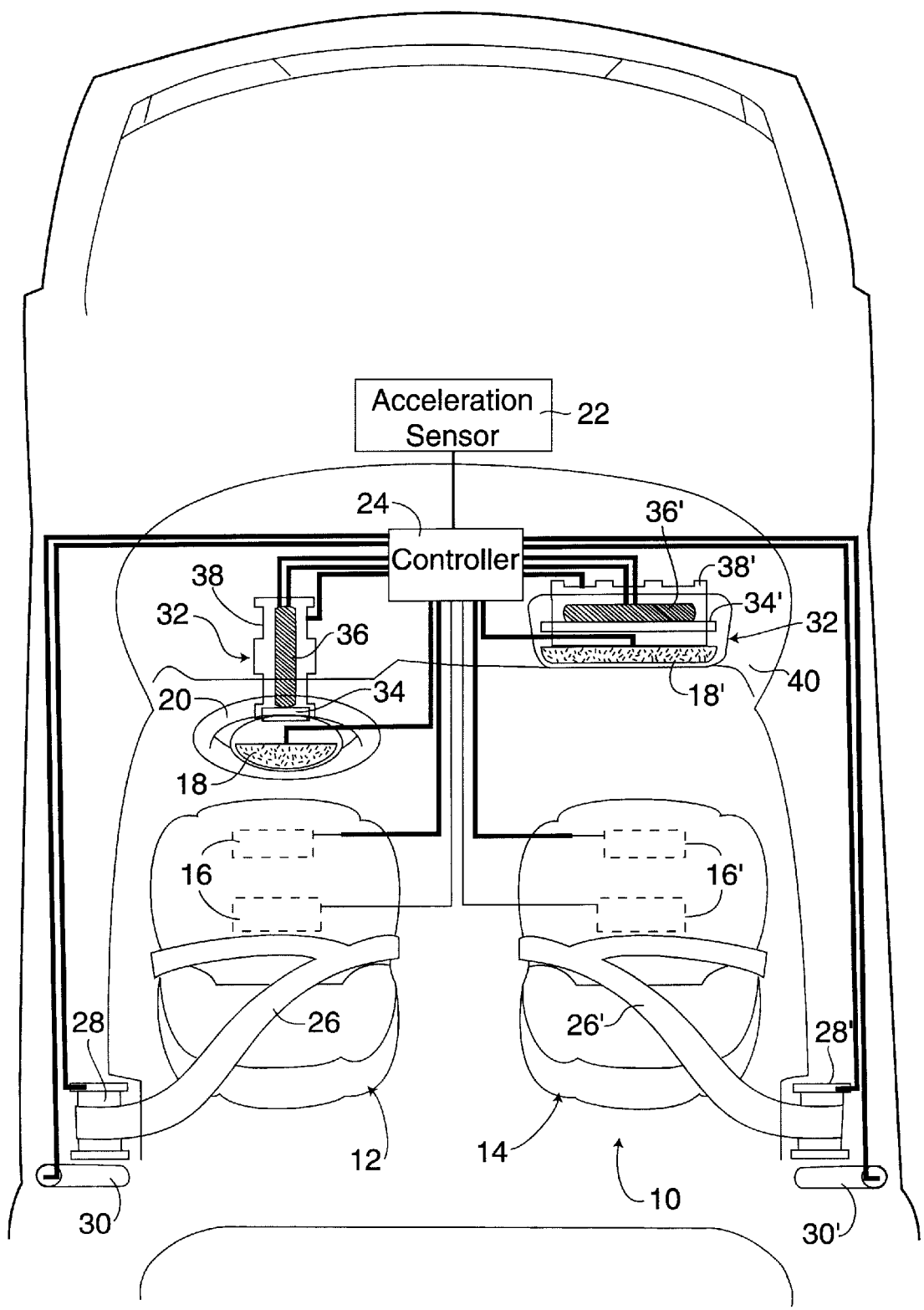
FIG. 1 is a top environmental view of the interior of a motor vehicle showing the weight sensor of the present invention incorporated into an exemplary safety restraint system.

Referring now to FIG. 1, a safety restraint system 10 for a motor vehicle is shown in association with a driver-side seat 12 and a passenger-side seat 14. Safety restraint system 10 includes a crash management system which functions to detect various crash severity and occupant position characteristics and controls activation of several restraint devices in response thereto. In association with driver seat 12, the crash management system is shown to include a pair of weight sensors 16, an occupant proximity sensor 18 mounted in a steering wheel 20, and an acceleration sensor 22, all of which provide a sensor input signal to a controller 24. The restraint devices associated with driver seat 12 include a safety belt 26 (having a lap belt portion and a shoulder belt portion), a multi-level energy absorbing seat belt retractor 28, a pretensioner or belt tightener 30, and an air bag module 32 mounted in steering wheel 20. Air bag module 32 includes an air bag 34, a single rate or variable rate inflator 36, and an optional variable venting valve 38. Controller 24 sends output signals to control activation of each of these restraint devices based on the sensor input signals. For the sake of brevity, the components associated with passenger seat 14 which are generally similar in function to those described for driver seat 12 are commonly designated by primed reference numerals. As seen, air bag module 32' is mounted in dashboard 40. The above system components and their mode of operation are generally well known and need not be disclosed in exacting detail. Subsequent to being locked by its vehicle or web inertial sensors, energy absorbing retractor 28 will permit safety belt 26 to protract and allow the occupant to move forwardly in a controlled manner. Prior to the controlled protraction of seat belt 26, a pretensioner 30, either associated with a seat buckle or with a retractor, eliminates any slack in safety belt 26 within milliseconds of sensing a crash. Inflator 36 generates inflation gas to inflate air bag 34. The rate at which air bag 34 is inflated can be varied by venting a portion of the inflation gas through variable venting valve 38. Further, if inflator 36 is a variable rate inflator, controller 24 will generate one or more control signal to produce inflation gas at a level and within a predetermined time period to inflate air bag 34 at one or more rates of inflation. The rate of inflation can be varied in proportion to the severity of the crash, the size and/or weight of the occupant relative to the installation location of the air bag(s). Finally, activation of air bag 34 can be eliminated upon sensing that an occupant is not in the seat or if, for example, the seat is only occupied by an inanimate object.

Figure 2:
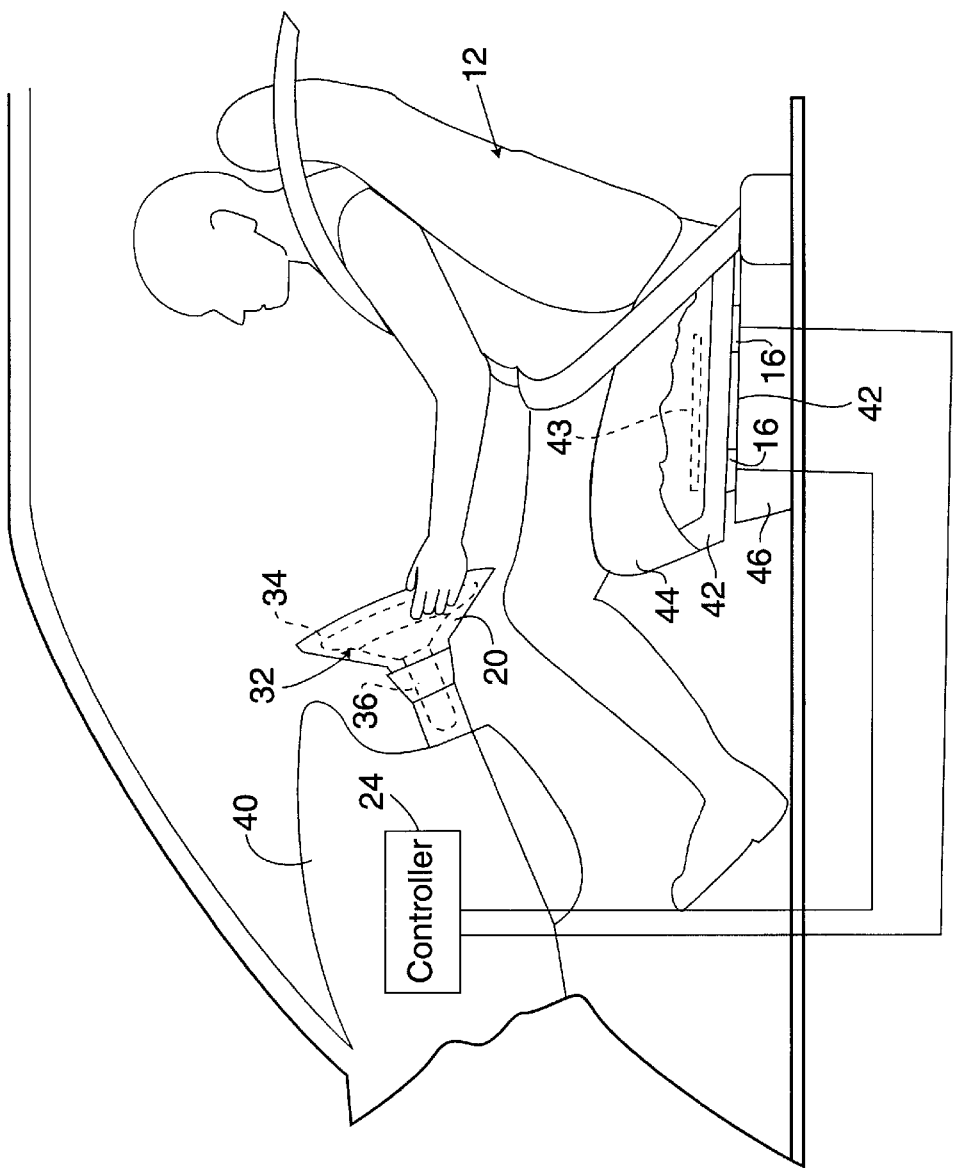
FIG. 2 is a side environmental view illustrating the location of the weight sensors in relation to the vehicle seat.

Referring now to FIG. 2, weight sensors 16 are shown mounted in driver seat 12 at a location which is subject to the weight of the occupant or object located in the seat. One such weight sensor location is between a seat pan 42 of a seat cushion 44 and a mounting structure 46 which may include a slide device for permitting fore/aft adjustment. Seat pan 42 is a frame component of seat cushion 44 while mounting structure 46 is secured to the vehicle's floor pan. The weight sensors 16 can also be sandwiched between seat pan 42 and a secondary plate 43 which is located within cushion 44 below the typical foam layer. When an occupant sits in seat 12, his/her weight is transferred from cushion 44 and plate 43 or seat pan 42 through weight sensors 16 and into mounting structure 46. As such, the algebraic sum of the weight distributed through each weight sensor 16 equals the total weight of the seat occupant. While two weight sensors 16 are shown, it is contemplated that any number of such sensors can be used as is dictated by each particular vehicular seat application. For example, a single weight sensor 16 could be centrally positioned relative to seat pan 42 or, alternatively, a group of four weight sensors 16 could be arranged near or at the corners of seat pan 42. Finally, the position of weight sensors 16 within driver seat 12 (or passenger seat 14) can be varied as long as the occupant's weight is transferred therethrough.

Figure 3:
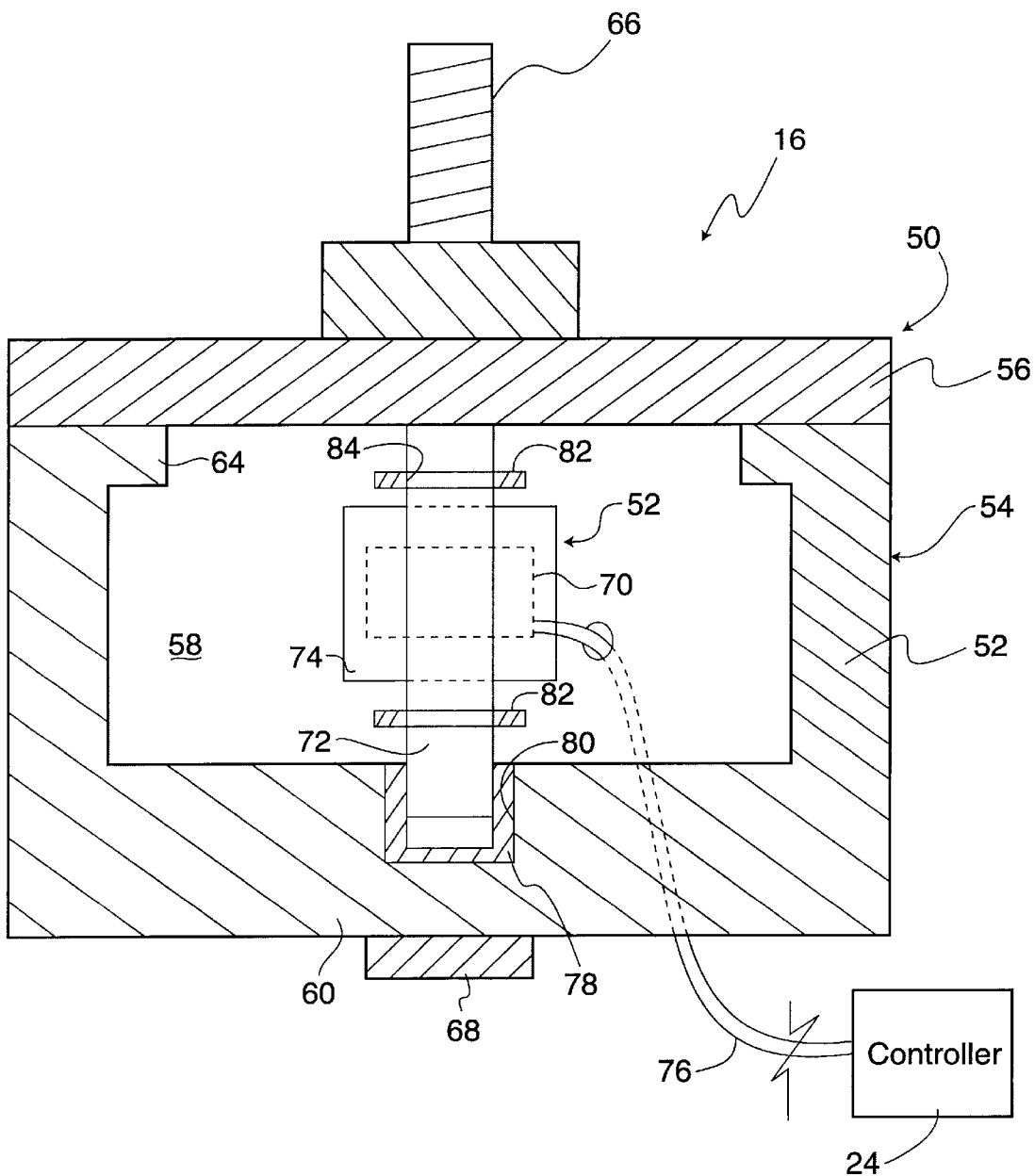
FIGS. 3 and 4 are sectional views showing the weight sensor.
Figure 4:
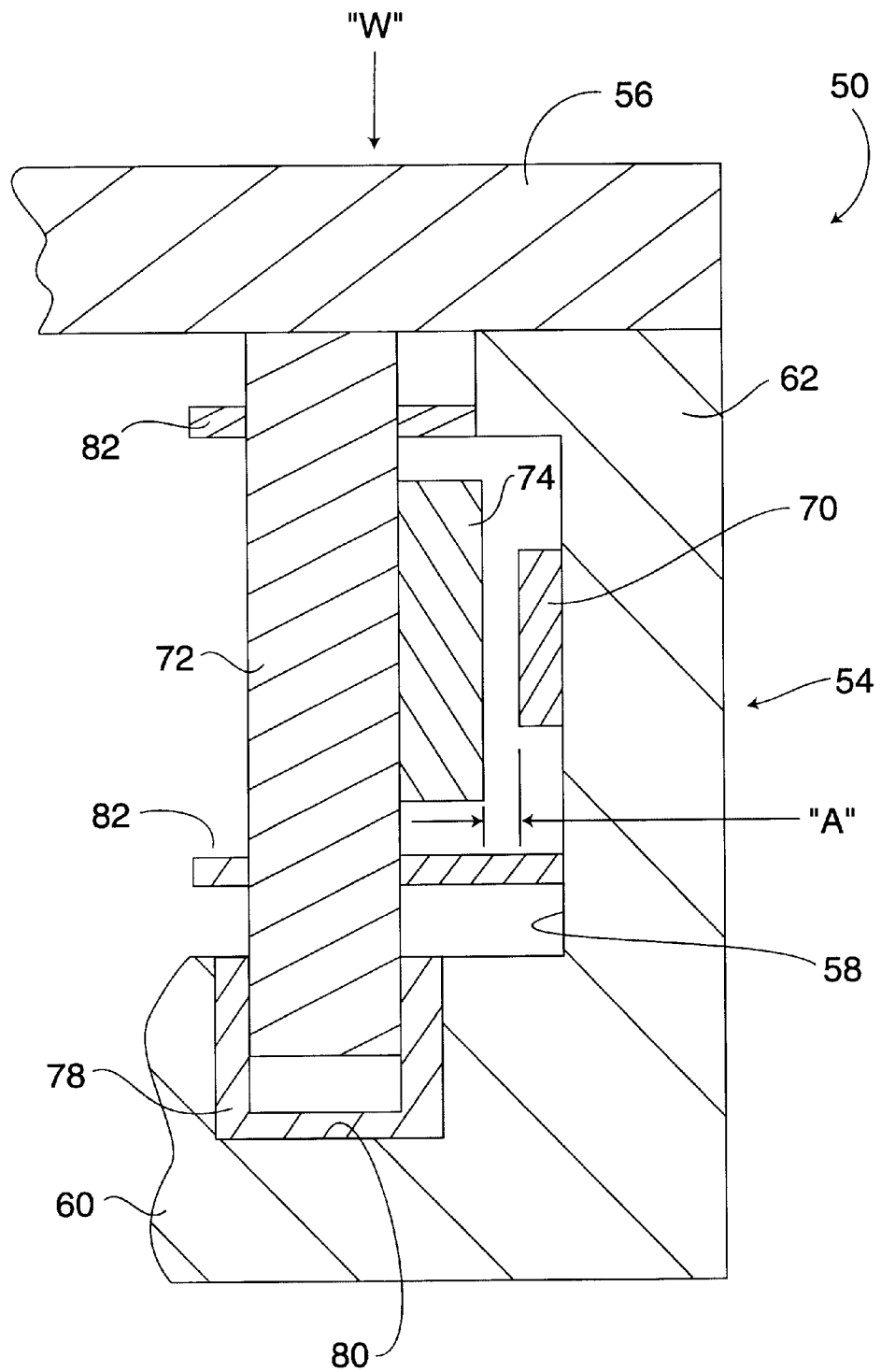

Referring now to FIGS. 3 and 4, a first embodiment of weight sensor 16 is shown. In general, weight sensor 16 includes a housing assembly 50 and a position sensing unit 52 retained within housing assembly 50. Housing assembly 50 includes lower housing part or a drum 54 and a deformable cover plate 56 appropriately sealed to the drum. Drum 54 has a chamber 58 defined between a bottom plate segment 60 and a continuous side wall segment 62. A mounting flange 64 extends transversely from side wall segment 62 to provide a surface against which cover plate 56 is secured. Flange 64 could be continuous or formed from a series of isolated lugs. Housing assembly 50 could be square, rectangular, cylindrical, or any other shape. An upper mounting stud 66 is fixed to cover plate 56 for mounting to seat pan 42 or plate 43 and a lower mounting flange 68 is fixed to bottom plate segment 60 of drum 54 for mounting to mounting structure 46 or seat pan 42. In a general sense the bottom plate segment 60 and cover plate 56 can be viewed as respective wall segments of the housing assembly 50.

Position sensing unit 52 is disposed within chamber 58 of drum 54 and includes a Hall effect sensor 70, a non-magnetic support link or rod 72, and a permanent magnet 74. Hall effect sensor 70 is fixed to side wall segment 62 of drum 54 and is in electrical communication with controller 24 via an electrical connector 76. Support link 72 has one end rigidly fixed to an underside surface of cover plate 56 while its opposite end is supported in a guide bushing 78 retained in a bore 80 formed in bottom plate segment 60 of drum 54. An optional bearing plate or pair of bearing plates 82 are fixed to side wall segment 62 of drum 54 and have apertures 84 closely surrounding intermediate segments of support link 72. Bushing 78 and bearing plates 82 cooperate to guide vertical movement of link 72 in response to deflection of cover plate 56 while minimizing lateral and side-to-side movement (i.e., play) thereof. Permanent magnet 74 is fixed to support link 72 to overlie Hall effect sensor 70 while bearing plates 82 and bushing 78 cooperate to maintain a constant air gap "A" therebetween (see FIG. 4). As an option to that described, magnet 74 can be fixed to side wall segment 62 of drum 54 and Hall effect sensor 70 can be secured to support link 72.

In operation, position sensing unit 52 is used to measure the change in magnetic field strength caused by vertical displacement of cover plate 56 relative to bottom plate segment 60 of drum 54 caused by the weight "W" of the seat occupant. Specifically, Hall effect sensor 70 is supplied with electrical energy from controller 24 and is a transducer which generates an electrical output signal, the magnitude of which is proportional to the position of magnet 74 relative to Hall effect sensor 70. Vertical displacement of magnet 74, due to resilient deflection of cover plate 56 causes a corresponding change in the magnetic field, as measured by Hall effect sensor 70, and is outputted to controller 24 as a corresponding output voltage signal. Since the amount of displacement of magnet 74 can be correlated to the amount of deflection of cover plate 56, the output signal from position sensing unit 52 can be correlated, upon calibration, by a conversion factor(s) to determine the occupant's or object's weight.

To facilitate deflection of cover plate 56, it is preferably made of a material, such as aluminum (or rubber or plastic), having the capacity to be resiliently deflected (and returned to an unstressed condition when the weight is removed) for permitting weight determination through an anticipated weight range for the seat occupants. Preferably, magnet 74 is a bipolar rod-type magnet such that Hall effect sensor 70 can produce both positive and negative output signals proportional to the deflected position of magnet 74. This method allows for the measurement of deflection associated with both tension and compression forces to account for variations in the position of the occupant in the seat. The output signal of each weight sensor 16 is transmitted to controller 24 to calculate the weight of the occupant or object. The algebraic sum of the output signal from each weight sensor equals the weight of the occupant or object, irrespective of the occupant's or object's position. The calculated weight can then be used to adaptively control actuation of safety restraint system 10 for optimizing occupant protection. Due to anticipated temperature variations within the vehicle environment, it is contemplated that a thermistor or a solid state temperature sensing device can be embedded in Hall effect sensor 70 to compensate for temperature variations within the vehicle.

Figure 5:
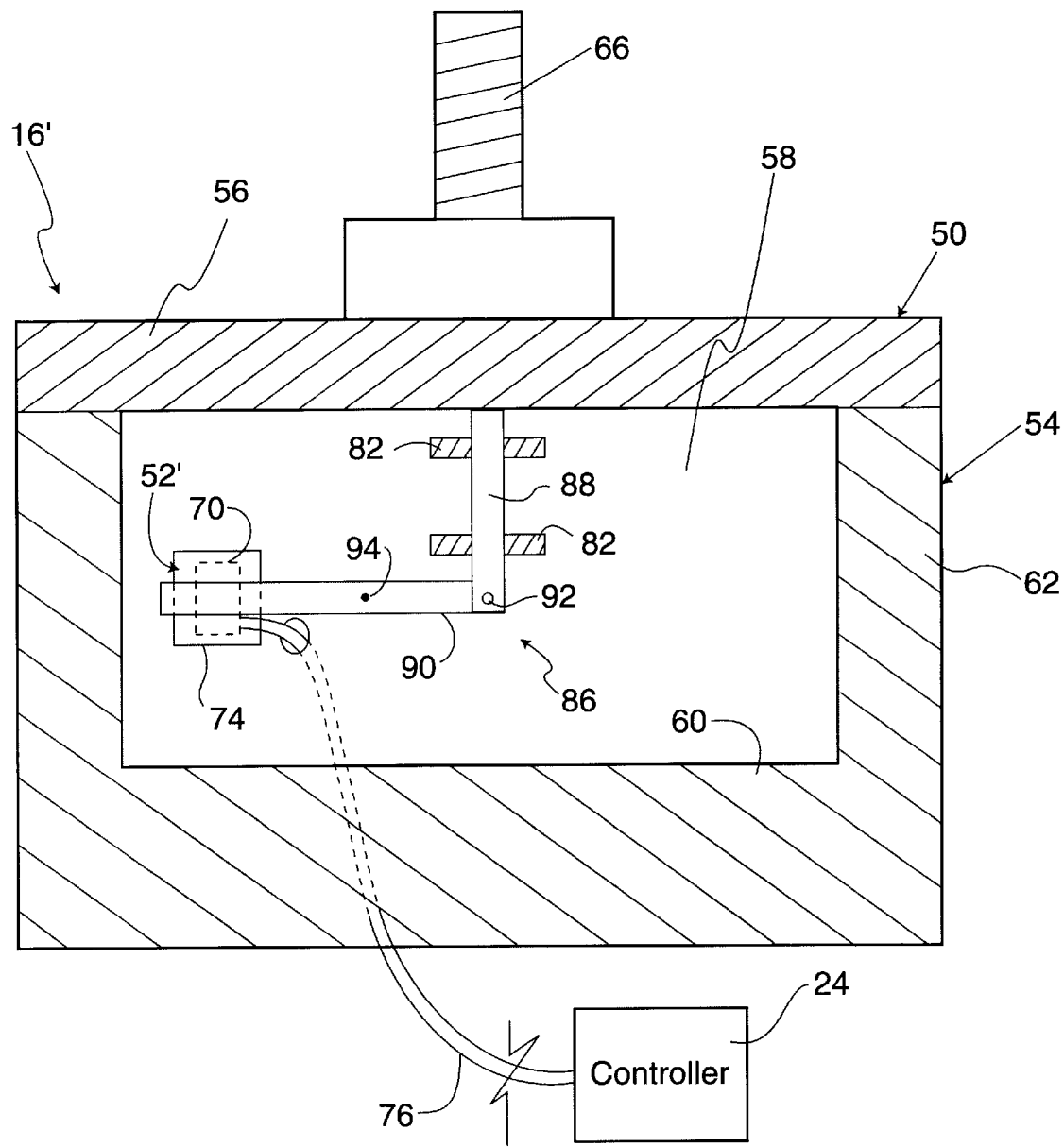
FIG. 5 is a sectional view of an alternative embodiment of the weight sensor.

Referring now to FIG. 5, an alternative embodiment weight sensor 16' is shown. In particular, a modified position sensing unit 52' is shown to incorporate a mechanical amplification device 86 in place of support link 72. Due to the use of components common to those previously disclosed, like numbers are used. Mechanical amplification device 86 includes a first link 88 fixed to cover plate 56 and which is pivotably connected to a second link 90 via a first pivot pin 92. Second link 90 is pivotably connected to side wall 62 of drum 54 via a second pivot pin 94. In operation, vertical deflection of first link 88 causes pivotal movement of second link 90. A magnet 74 is fixed to second link 90 such that pivotal movement of second link 90 causes displacement of magnet 74 relative to Hall effect sensor 70 which is secured to side wall 62 of drum 54. Thus, in this embodiment, the angulation between links 88 and 90 is used to maximize signal resolution such that small displacements of cover plate 56 will result in larger changes in the travel of magnet 74 relative to Hall effect sensor 70. As a result, the greater range of displacement values along position sensing unit 52' will improve (i.e., provide finer resolution) accuracy for the weight measurement.

The present invention being thus described, it will be obvious to those skilled in the art that the invention may be varied in many ways. Accordingly, such variations are not to be regarded as a departure from the spirit and scope of the invention, and all such modifications are intended to be included within the scope of the following claims.

What is claimed is:

1. A safety restraint system for restraining an occupant seated in a seat, comprising:

a restraint device (32) which can be selectively activated to restrain the occupant;

a weight sensor means (16) for determining the weight of the occupant and generating an output signal indicative thereof, the weight sensor means (16) including a housing (50) secured relative to the seat and a position sensing unit (52) retained in the housing (50) for generating the output signal as a function of the amount of displacement of at least a portion of the housing (50) relative to the position sensing unit (52) caused by the occupant's weight; and a controller (24) for controlling activation of the restraint device (32) in response to the output signal;

wherein the housing (50) defines a chamber (58) having a first wall segment (62) and a second wall segment (56), and wherein the position sensing unit (52) includes a Hall effect sensor (70) secured to the first wall segment (62), and a magnet (74) fixed to the second wall segment (56), whereby deflection of the second wall segment (56) caused by the weight of the occupant being applied to the housing (50) causes a corresponding change in the position of the magnet (74) such that the Hall effect sensor (70) detects a change in magnetic field strength which corresponds to the weight of the occupant;

wherein the position sensing unit (52) further includes a support link (72) fixed to the second wall segment (56) and to which the magnet (74) is fixed, whereby deflection of the second wall segment (56) causes vertical displacement of the support link (72) and the magnet (74) relative to the Hall effect sensor (70);

further comprising means for guiding vertical movement of the support link (72) while maintaining a constant air gap between the magnet (74) and the Hall effect sensor (70).

2. A safety restraint system for restraining an occupant seated in a seat, comprising:

a restraint device (32) which can be selectively activated to restrain the occupant;

a weight sensor means (16') for determining the weight of the occupant and generating an output signal indicative thereof, the weight sensor means (16') including a housing (50) secured relative to the seat and a position sensing unit (52') retained in the housing (50) for generating the output signal as a function of the amount of displacement of at least a portion of the housing (50) relative to the position sensing unit (52') caused by the occupant's weight; and a controller (24) for controlling activation of the restraint device (32) in response to the output signal;

wherein the housing (50) defines a chamber (58) having a first wall segment (62) and a second wall segment (56), and wherein the position sensing unit (52') includes a Hall effect sensor (70) secured to the first wall segment (62), and a magnet (74) fixed to the second wall segment (56), whereby deflection of the second wall segment (56) caused by the weight of the occupant being applied to the housing (50) causes a corresponding change in the position of the magnet (74) such that the Hall effect sensor (70) detects a change in magnetic field strength which corresponds to the weight of the occupant;

wherein the position sensing unit (52') further includes a first link (88) fixed to the second wall segment (56), and a second link (90) pivotably connected to the first link (88) via a first pivot member (92), the second link (90) is pivotably connected to the first wall segment (62) via a second pivot member (94) and has the magnet (74) fixed thereto, whereby deflection of the second wall segment (56) causes a change in the angularity between the first and second links which causes a change in the position of the magnet (74) relative to the Hall effect sensor (70).

3. The safety restraint system of claim 2 wherein the weight sensor means includes a plurality of weight sensors, each having a housing and position sensing unit for generating a respective output signal, and the controller generates a composite signal proportional to the algebraic sum of the respective output signals.

4. A weight sensor for determining the weight of an occupant sitting in a seat, comprising:

a housing (50) secured relative to the seat and which includes a wall segment and a cover plate (56) adapted to deflect in response to the occupant's weight being transferred to the housing (50);

a Hall effect sensor (70) immovably secured to the wall segment of the housing (50); and a magnet (74) fixed to and movable with the cover plate (56), whereby deflection of the cover plate (56) causes changes in the magnitude of the magnetic field generated between the magnet (74) and the Hall effect sensor (70) corresponding to the weight of the seat occupant;

a support link (72) fixed to the cover plate (56) and to which the magnet (74) is fixed, whereby deflection of the cover plate (56) causes vertical displacement of the link (72) and the magnet (74) relative to the Hall effect sensor (70); and further comprising means for guiding vertical movement of the support link (72) while maintaining a constant air gap between the magnet (74) and the Hall effect sensor (70).

5. The weight sensor as defined in claim 4 wherein the wall segment is part of a drum.

6. A weight sensor for determining the weight of an occupant sitting in a seat, comprising:

a housing (50) secured relative to the seat and which includes a plate (56) adapted to deflect in response to the occupant's weight being transferred to the housing (50);

a Hall effect sensor (70) immovably secured to the housing (50); and a magnet (74) fixed to and movable with the plate (56), whereby deflection of the plate (56) causes changes in the magnitude of the magnetic field generated between the magnet (74) and the Hall effect sensor (70) corresponding to the weight of the seat occupant;

wherein the housing (50) includes a drum (54) and the plate is a cover plate (56) secured to the drum (54), and wherein the Hall effect sensor (70) is fixed to a wall segment (62) of the drum and the magnet (74) is fixed to the cover plate (56); and further including a first link (88) fixed to the cover plate (56), a second link (90) pivotably connected to the first link (88) via a first pivot member (92), the second link (90) is pivotably connected to the drum (54) via a second pivot member (94) and the magnet (74) is fixed to the second link (90), whereby deflection of the cover plate (56) causes a change in the angularity between the first and second links which causes a change in the position of the magnet (74) relative to the Hall effect sensor (70) and the magnitude of the magnetic field detected by the Hall effect sensor (70).

* * * * *